US 6,733,697 B2

(12) United States Patent
Rhodes et al.

(10) Patent No.: US 6,733,697 B2
(45) Date of Patent: May 11, 2004

(54) ACTIVATED FLAME RETARDANTS AND THEIR APPLICATIONS

(76) Inventors: Michael S. Rhodes, 6622 Riverdale Ave., Bronx, NY (US) 10471; Leonid Izrailev, 105 Avenue P, Brooklyn, NY (US) 11204; Jason Tuerack, 11 Tompkins Ave., Jericho, NY (US) 11752; Philip S Rhodes, 1261 Trafalgar St., Teaneck, NJ (US) 07666

(*) Notice: Subject to any disclaimer, the term of this patent is extended or adjusted under 35 U.S.C. 154(b) by 58 days.

(21) Appl. No.: 10/200,036

(22) Filed: Jul. 22, 2002

(65) Prior Publication Data

US 2004/0012004 A1 Jan. 22, 2004

(51) Int. Cl.[7] ............ C09K 21/04; C09K 21/12; C08K 3/24; C08K 5/06
(52) U.S. Cl. ............ 252/606; 524/99; 524/108; 524/136; 524/141
(58) Field of Search ............ 252/606, 609; 524/99, 108, 136, 141

(56) References Cited

U.S. PATENT DOCUMENTS

| 4,446,916 A | | 5/1984 | Hayes |
| 5,093,395 A | * | 3/1992 | Torisu ............ 524/99 |
| 5,709,914 A | | 1/1998 | Hayes |
| 5,798,407 A | * | 8/1998 | Yano et al. ............ 524/504 |
| 6,015,510 A | * | 1/2000 | Jacobson et al. ............ 252/609 |
| 6,224,784 B1 | | 5/2001 | Hayes |
| 6,235,216 B1 | | 5/2001 | Hayes |
| 6,241,909 B1 | | 6/2001 | Hayes |
| 6,241,910 B1 | | 6/2001 | Hayes |
| 6,261,475 B1 | | 7/2001 | Hayes |
| 6,264,854 B1 | | 7/2001 | Hayes |
| 6,341,384 B1 | | 1/2002 | Hayes |
| 6,558,568 B1 | | 5/2003 | Hayes |
| 2002/0081402 A1 | | 6/2002 | Hayes |
| 2002/0093001 A1 | | 7/2002 | Hayes |
| 2002/0096658 A1 | | 7/2002 | Hayes |
| 2002/0100894 A1 | | 8/2002 | Hayes |

FOREIGN PATENT DOCUMENTS

| JP | 52116480 A | * | 9/1977 | ............ C07D/19/08 |

OTHER PUBLICATIONS

JPO abstract of JP52116480A (Sep. 29, 1977), Nishihara et al.*

* cited by examiner

*Primary Examiner*—Matthew A. Thexton
(74) *Attorney, Agent, or Firm*—Pillsbury Winthrop LLP

(57) ABSTRACT

The present invention relates to a method of enhancing the flame retardancy of nitrogenous phosphorus and/or sulfonate flame retardants, the enhanced (or activated) nitrogenous phosphorus and/or sulfonate flame retardants and their applications. The activated flame retardants are activated with either a char forming catalyst, a phase transfer catalyst or both.

39 Claims, No Drawings

ACTIVATED FLAME RETARDANTS AND THEIR APPLICATIONS

FIELD OF THE INVENTION

The present invention relates to a method of enhancing the flame retardancy of flame retardants, the enhanced (or activated) flame retardants and their applications. The activated flame retardants provide enhanced flame retardancy to virtually a limitless number and types of applications. For example, the activated flame retardants provide improved flame retardancy in polymers (including thermosetting, thermoplastic, polymer matrices, mixtures of polymers, copolymer, terpolymers, etc . . . ) coatings, paints, films, resins, binders, and fibers.

BACKGROUND OF THE INVENTION

Several solutions are known in the art to reduce or eliminate the combustibility of polymers. Intumescent materials have been used for over forty years in industry. One of the first commercial intumescent agents used to provide fire protection by means of char formation was para nitro analine ortho sulfonic acid ammonium salt. Currently, the more common intumescent agents are generally constituted by the polymer of the system and at least three main additives: an essentially phosphorus-containing additive whose purpose is of forming, during the combustion, an impermeable, semi-solid vitreous layer, essentially constituted by polyphosphoric acid, and of activating the process of formation of intumescence; a second additive, containing nitrogen, which performs the functions of a foaming agent; and a third, carbon-containing additive, which acts as a carbon donor to allow an insulating cellular carbonaceous layer ("char") to be formed between the polymer and the flame. Phosphates that release phosphoric acid at high temperature are frequently employed.

Examples of intumescent formulations of this type include those reported by the following patents: U.S. Pat. No. 3,810,862 (Phillips Petroleum Co.) based on melamine, pentaerythritol and ammonium polyphosphate; U.S. Pat. No. 4,727,102 (Vamp S.r.l.), based on melamine cyanurate, a hydroxyalkyl derivative of isocyanuric acid and ammonium polyphosphate; U.S. Pat. No. 6,015,510 (E.I. du Pont de Nemours and Company) based on melamine pyrophosphate and other conventional components; and by published patent application WO 85/05626 (Plascoat U.K. Limited), on the basis of various phosphorus and nitrogen compounds among which, in particular, a combination of melamine phosphate pentaerthritol and ammonium polyphosphate has to be cited.

In more recent formulations, together with the use of an organic or inorganic phosphorus compound a nitrogen-containing organic compound was used, generally consisting of an amino plastic resin obtained by condensation of urea, melamine or dicyandiamide with formaldehyde.

Examples of formulations containing two additives are those reported in the following patents: U.S. Pat. No. 4,504,610 (Montedison S.p.A.) based on oligomeric derivatives of 1,3,5-triazine and ammonium polyphosphate; and European Pat. No. 14463 (Montedison S.p.A.) based on organic compounds selected from among benzylguanamine and reaction products between aldehydes and several nitrogenious cyclic compounds, in particular benzylguanamine-formaldehyde copolymers, and ammonium polyphosphate.

Self-extinguishing compositions can also be obtained by using single-component additives, which contain in their organic molecule both nitrogen and phosphorus atoms, as disclosed in U.S. Pat. No. 4,201,705 (Borg-Wagner Corp.).

These intumescent flame retardant systems endow the polymers, which contain them, with the property of forming a carbonaceous residue when they undergo a fire, or are exposed to high temperatures. The present invention provides a method for of improving present and future nitrogenous phosphorus and/or sulfonate flame retardants. The activated flame retardants of the present invention provide one or more of the following advantages: improved char yield (includes faster generation of char and/or higher quantity of char), char density, self-extinguishing characteristics, thermal insulation (upon activation), and/or lower smoke emissions to the composition.

SUMMARY OF THE INVENTION

The present invention provides a method of forming an activated nitrogenous phosphate and/or nitrogenous sulfonate flame retardant, having enhanced flame retardancy, by forming the nitrogenous phosphate and/or sulfonate component in the presence of a char forming catalyst and/or a phase transfer catalyst.

A further aspect of the present invention is an activated flame retardant comprising at least one nitrogenous phosphorus and/or sulfonate and at least one activator. An activator includes a char forming catalyst and/or a phase transfer catalyst.

Another aspect of the present invention provide an article having improved flame retardancy by the incorporation of an activated flame retardant.

DETAILED DESCRIPTION OF THE INVENTION

In this application, the following terms will be understood to have the following meaning:

"activated flame retardant" means a flame retardant that provides improved flame retardancy, for example as measured by the Char Yield Value test discussed herein, with the incorporation of at least one activator, char forming catalyst and/or phase transfer catalyst, of the present invention than without an activator. Preferably, the activator is present in the activated flame retardant in a minor amount, for example less than 5 wt. %, or even less than 2 wt. % and preferably between 0.01 to 1.8 wt. %;

"halogen-free" means essentially free of halogens [i.e., contains less than 0.25 percent (preferably, less than 0.1 percent; more preferably, less than 0.01 percent)] by weight halogen calculated on an elemental basis as Cl, F, etc., based on the total weight of the flame retardant;

"hetero" refers to a component or compound comprising in addition to carbon and hydrogen atoms another type of atom (preferably oxygen, nitrogen, or sulfur atoms);

"metal-free" means essentially free of metals [i.e., contains less than 0.25 percent (preferably, less than 0.1 percent; more preferably, less than 0.01 percent)] by weight metal calculated on an elemental basis, based on the total weight of the flame retardant; and "intumescent" refers to a material which expands upon heating above about 100° C., preferably above 190° C. or even 250° C., although the temperature at which a particular intumescent material intumesces is dependent on the composition of that material.

The activated flame retardants of the present invention may be used in the same applications as "uunactivated" flame retardants are presently used or would be used. The employment of the activated flame retardants impart enhanced flame retardancy. Specifically, the activated flame retardant imparts improved char yield (includes faster generation of char and/or higher quantity of char), char density, self-extinguishing characteristics, thermal insulation (upon activation), and/or lower smoke emissions to the composition. In addition, the preferred flame retardant of the present invention are those that are halogen-free and/or metal-free which impart known benefits to systems beyond the flame retardancy benefits.

As a consequence, the activated flame retardants may be employed to impart an increased flame retardancy or employed in lesser (loadings) amounts to impart comparable flame retardancy. The type and loading levels of the activated flame retardant in a particular system is dependent on the specific design criteria. The loading levels of the activated flame retardant may be for example as low as 1, 5, or 8 wt. % and as high as 20, 30 or even 50 wt. %, relative to the total weight of the system.

Typical systems in which the activated flame retardant may be employed include compositions comprising synthetic materials and/or polymers including epoxies, polyamides (including nylon 6,6, and nylon 4,6), polyesters, polycarbonates, polyacrylates, polyethers, polyolefins, polyurethanes, derivatives of these polymers, copolymers, mixtures of these polymers, and mixtures comprising these polymers with other components. Suitable thermoplastic polymers that may be incorporated into such compositions include, for example, olefinic polymers or copolymers, linear polyesters, unsaturated polyesters, poly vinylchlorides, polyurethanes, acrylonitrile-styrene copolymers (SAN) acrylonitrile-butadiene-styrene terpolymers (ABS), and SBR rubbers and thermosetting polymers include rubbers, polyester, polyalkyds, polyurethanes and epoxies.

Compositions employing the activated flame retardants of the present invention may be used in a variety of applications including, for example, the formation of articles, components, coatings, binders, paints, fibers, emulsions (including vinyl emulsions), adhesives, films, casings, construction materials, rubber or rubberized components, cookware, medical devices, composites, aeronautic components, putties, sealants, caulks, and fire barrier materials.

Generally, the activated flame retardants may be added into a composition by any conventional technique including the dry mixing of all or a number of components in a tumble mixer, followed by melting in a melt mixer, for example a Brabender mixer, and/or an extruder, by molding the components and the polymer simultaneously, by blending all the components together in powder form and thereafter, forming the desired product. The activated flame retardants may also be incorporated into a system by introducing the activated flame retardant during the reaction phase of one or more of the components of the composition. It may be that incorporating the activated flame retardant in with the monomers prior to the formation of the polymer may further enhance the effectiveness of the activated flame retardant.

The activated flame retardant comprises a nitrogenous phosphate or sulfonate component formed in the presence of an activator. The nitrogenous phosphate or sulfonate component may be formed using any of the conventional techniques with the activator being introduced at least in part prior to the formation of the final product. For example, the activator may be introduced either in total or in part with one or more of the nitrogen containing compounds and then have the phosphorus or sulfur containing compound reacted in. These nitrogenous phosphate or sulfonate components may also be formed by introducing parts of one or more of the reactants in steps. For example, a portion of the total amount of the nitrogen containing reactant may be added to a portion of the activator followed by a portion of the phosphorus or sulfur containing reactant and then repeated in any order and in as many steps as desired to obtain the final activated flame retardant.

The selection of the nitrogen containing reactant and the phosphorus or sulfur containing reactant used is a matter of design choice. Suitable reactants include those known for use in forming nitrogenous phosphate or sulfonate flame retardants, for example ammonium phosphate, ammonium pyrophosphate, ammonium polyphosphate, ethylenediamine phosphate, piperazine phosphate, piperazinepyrophosphate, melamine phosphate, dimelamine phosphate, melamine pyrophosphate, guanidine phosphate, dicyanodiamide phosphate urea phosphate, ammonium sulfonate, ammonium polysulfonate, ethylenediamine sulfonate, dimelamine suflonate, quanidine sulfonate, and dicyanodiamide sulfonate. For example, suitable nitrogen containing reactants include ammonium, alkyleneamines (including diamines), triazine, melamine, melam, melem, melon, ammeline, ammelide, 2-ureidomelamine, acetoguanamine, benzoguanamine, quanidine, dicyanodiamide, diamine phenyltriazine or mixtures hereof. Preferred nitrogen containing reactants include melamine, ammonium, and ethylene diamine. Examples of suitable phosphorus or sulfur containing reactants include phosphoric acid and sulfonic acid.

The activator is a component that enhances the performance of the nitrogenous phosphate and/or sulfonate component and preferably is a char forming catalyst or a phase transfer agent or a combination of both. The activator can be present in the flame retardant in any amount that provides the acceptable enhanced flame retardancy, for example up to 5, 8 or 10 wt. % and as little as 0.01, 0.1 and 0.2 wt. %. It is preferred to use both a char forming catalyst and a phase transfer catalyst together these may be present in the flame retardant in an amount between 0.1, preferably 0.3, and 3.0, preferably 2.5 wt. %, based on the total weight of the flame retardant.

Although not wanting to be held to any particular theory, it has been said that the char forming catalyst may act, at the time of decomposition of part of the system, to grab onto decomposing molecules thereby minimize the production of low molecular weight components and enabling rapid development of char. It has been similarly theorized that this recombinant process, that is aided by the char forming catalyst, mimics the recombinant role that the helical DNA plays in nature. Consequently, exemplary char forming catalysts of the present invention include multi-cyclic compounds having at least one reactive group in each of at least two rings, wherein the rings are joined together by atoms common to both rings. These may include spiro-compounds comprising at least two heterocyclic ring structures joined by at least one carbon atom common to both rings.

Preferred char forming catalyst include spiro-compounds represented by the following formula I:

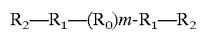

$$R_2—R_1—(R_0)m\text{-}R_1—R_2 \qquad\qquad I$$

wherein
m represents a number between 1 and 8, for example less than 3 or less than 2;
$R_0$—independently represent a di- tri-, or quad-valent radical comprising two independently substituted or unsubstituted, saturated or unsaturated heterocyclic ring structures joined by at least one common carbon atom and preferably no more than two, for example one, carbon atoms common to the heterocyclic ring structures;

$R_1$—independently represents a bond; or a substituted or unsubstituted, saturated or unsaturated hydrocarbyl or heterocarbyl linking group, preferably a C1–C6 alkyl linking group, for example a C3 alkyl; and $R_2$—independently represents a terminal group, preferably a terminal amine for example a primary amine.

Exemplary compounds include those wherein the heterocyclic ring structure comprises at least two hetero atoms in at least two heterocyclic ring structures, and/or $R_0$ independently represents a divalent radical, preferably with at least one, for example two (including two adjacent), heterocyclic ring structures being 6-member. These compounds may also include those wherein the hetero atom in the heterocyclic rings is predominately oxygen.

The preferred char catalyst includes those having a molecular weight of at least 180, preferably at least 200 and/or a flash point of greater than 200° C. A preferred char forming catalyst includes derivatives of a tetraoxaspiro undecane, for example amine derivatives, for example 2,4,8,10-tetraoxaspiro-5,5-undecane-3,9-dipropamine. The char forming catalyst component may also include adducts, for example amine adducts, nitrile (include 2-propenenitrile) and/or oxirane (including butoxymethyl oxirane) adducts.

The phase transfer agent may be any component known for such purpose. Suitable phase transfer catalyst include tetrahydrocarbyl ammonium salts, for example tetramethyl, tetraethyl, tetrapropyl, tetralkyl, and/or aryltrialkyl ammonium salt wherein the salt is a bromide, chloride, hydroxide and/or hydrogen sulfate ammonium salt. Preferably, the phase transfer catalyst includes phosphate esters, tetraethylammonium bromide, tetraethylammonium hydroxide, tetrapropylammonium bromide, tetrabutyl ammonium bromide, tetrabutyl ammonium hydroxide, tetrabutyl ammonium hydrogen sulfate and/or benzyltriethyl ammonium chloride.

Compositions of the present invention may additional comprise conventional additives such as reinforcing fillers, pigments such as carbon black, and titanium dioxide, dyes, ultraviolet stabilizers, plasticizers, fungicides, extenders, waxes, antioxidants, and the like, in amounts known to those skilled in the art.

Other useful fillers include fumed silica, calcium and magnesium carbonates, calcium and barium sulfates, aluminum silicates, and the like, which may be included in small amounts, such that they do not interfere with the physical properties required.

EXAMPLES

Objects and advantages of this invention are further illustrated by the following examples, but particular materials and amounts thereof recited in these examples, as well as conditions and details, should not be construed to unduly limit this invention.

Test Method: Char Yield Value

Char yield value for the coating samples was measured by pouring about 10 grams of the coating into an aluminum lab pan an allowing the coating to cure either overnight or in an oven for approximately 1 hour @ 80° C. After curing, the coated substrate was weighted (initial weight, not inclusive of the lab pan weight) and then placed in a muffle furnace, maintained at 1000° C., overnight. The charred, coated substrate was allowed to cool and weighted again (final weight, not inclusive of the lab pan weight).

Char Yield Value=(final weight/initial weight)×100.

The higher the char yield value, the better the flame retardancy of the coating.

| Glossary of Materials: | |
|---|---|
| BTEAC | Benzyltriethyl Ammonium Chloride |
| B-001 | 2,4,8,10 tetraoxaspiro (5,5) undecane-3,9-dipropanamine adduct with 2-propenenitrile commercially available from Ajinomoto, Inc. under the tradename YSE-CURE B-001 |
| B-002 | 2,4,8,10-tetraoxaspiro (5,5) undecane-3,9-dipropanamine with an amine adduct commercially available from Ajinomoto, Inc. under the tradename YSE-CURE B-002. |
| D-230 | Polyoxypropylenediamine commercially available from Huntsman Corp., under the tradename Jeffamine D-230. |
| Epoxy | Bisphenol A/Epichlorohydrin based epoxy resin commercially available from Shell under the tradename EPON 828. |
| Fyrol CEF | Tri(2-chloroethyl) phosphate commercially available from AKZO Nobel. |
| Fyrol DMMP | Dimethyl methylphosphonate commercially available from AKZO Nobel |
| NYAD | NYAD - Wollastonite is a naturally occurring mineral commercially available from NYCO Minerals Inc. |
| Paint 20 | vinyl acrylic exterior semi-gloss latex paint commercially available from Vista Paints |
| TBABr | Tetrabutylammonium Bromide |
| TBAHS | Tetrabutylammonium Hydrogen Sulfate |

Example 1

Preparation of Ammonium Polyphosphate Flame Retardant

To 900 grams of water, while under agitation, was added 240 grams ammonium and B-001, a char catalyst, in an amount such that the final, dried ammonium polyphosphate product consisted of the wt. % set forth in Table 1 below. The mixture was warmed to 170° F. and while maintaining temperature phosphoric acid was slowly added until a pH of 7.0 was reached. The mixture was cooled, filtered, dried and ground to recover the flame retardant.

Char Yield Value Testing

The flame retardancy of the various ammonium polyphosphate flame retardants was established by preparing coating samples by mixing the various flame retardants into a clear epoxy resin and a latex paint composition formed from the components as set forth in Tables 1-A&C, respectively, and testing for the char yield value in accordance with the method set forth herein. The results are reported in Tables 1-B&D, respectively.

Table 1-A

| CLEAR EPOXY RESIN | |
|---|---|
| Component | Wt. % |
| Component A | |
| Epoxy | 55 |
| Fyrol DMMP | 13 |
| Flame Retardant | 32 |
| Component B | |
| B-001 | 64.5 |
| D-230 | 35.5 |
| Ratio Comp.A:Comp. B | 1:0.26 |

TABLE 1-B

Char Yield Value of Ammonium Polyphosphate Flame Retardant

| Type of Char Catalyst | Amount of Char Catalyst Present in Flame Retardant | | | | |
|---|---|---|---|---|---|
| | Control | 0.1 wt.% | 0.2 wt.% | 0.5 wt.% | 1.0 wt.% |
| B-001 | 30 | 46 | 48 | 50 | 50 |

Table Note: Control is the epoxy resin composition with a flame retardant having 0 wt.% char catalyst.

TABLE 1-C

LATEX PAINT

| Component | Wt. % |
|---|---|
| Paint-20 | 64 |
| Melamine | 10 |
| Pentaerythritol | 3 |
| Blowing Agent | 3 |
| Flame Retardant | 20 |

TABLE 1-D

Char Yield Value of Ammonium Polyphosphate Flame Retardant

| Type of Char Catalyst | Amount of Char Catalyst Present in Flame Retardant | | | | |
|---|---|---|---|---|---|
| | Control | 0.1 wt.% | 0.2 wt.% | 0.5 wt.% | 1.0 wt.% |
| B-002 | 30 | 42 | 45 | 46 | 47 |

Table Note: Control is the latex paint composition with a flame retardant having 0 wt.% char catalyst.

Example 2

Preparation of Melamine Pyrophosphate Flame Retardant

1200 grams of water was warmed to 130° F. To this, while being agitated, was added 100 grams of melamine (2,4,6-triamine-1,3,5-triazine) and a char and/or phase transfer catalyst as set forth in Table 2-B below. The mixture was then warmed to 150° F. and 104.5 grams of tetrasodium pyrophosphate was added. The mixture was heated to 170° F. and the slow addition of 200 grams of twenty degree Baumé muriatic acid was started. Warming was continued until to 200° F., at which time cooling is started. When cooled to 70° F., the mixture was filtered, dried and ground to recover the flame retardant.

Char Yield Value Testing

The flame retardancy of the various ammonium pyrophosphate flame retardants was established by preparing epoxy resin coating samples by mixing the various flame retardants into the epoxy resin composition formed from the components as set forth in Table 2-A, and testing for the char yield value in accordance with the method set forth herein. The results are reported in Table 2-B.

TABLE 2-A

EPOXY RESIN

| Component | Wt. % |
|---|---|
| Component A | |
| Epoxy | 45 |
| Fyrol CEF | 12.7 |
| Aluminum Trihydrate NYAD | 12.7 |
| Titanium Dioxide | 3 |
| Flame Retardant | 25 |
| Component B | |
| B-001 | 100 |
| Ratio Comp.A:Comp. B | 4:1 |

TABLE 2-B

Char Yield Value of Melamine Pyrophosphate Flame Retardant

| Type of Char and/or Phase Transfer Catalyst | Amount of Catalyst Present in Flame Retardant | | | | |
|---|---|---|---|---|---|
| | Control | 0.1 wt. % | 0.2 wt. % | 0.5 wt. % | 1.0 wt. % |
| B-001 | 34 | 50 | 52 | 55 | 57 |
| B-002 | 35 | 43 | 45 | 48 | 49 |
| TBABr | 30 | 37 | 39 | 41 | 43 |
| TBAHS | 30 | 38 | 43 | 45 | 47 |
| B-001 (TBAHS @ 0.5 wt.%) | 30 | 54 | 63 | 70 | 72 |
| TBAHS (B-001 @ 0.5 wt.%) | 30 | 56 | 61 | 70 | 71 |
| BTEAC (B-001 @ 0.5 wt.%) | 30 | 42 | 52 | 61 | 68 |

Table Note: Control is the epoxy resin composition with a flame retardant having 0 wt.% char catalyst.

Example 3

Preparation of Ethylene Diamine Flame Retardant

To 900 grams of water, while under agitation, was added 240 grams of ethylene diamine and TBAHS, a phase transfer catalyst, as set forth in Table 3 below. The mixture was warmed to 170° F. and, while maintaining temperature, phosphoric acid was slowly added until a pH of 7.0 was reached. The mixture was cooled, filtered, dried and ground to recover the flame retardant.

Char Yield Value Testing

The flame retardancy of the various ethylene diamine phosphate flame retardants was established by preparing epoxy resin coating samples by mixing the various flame retardants into the epoxy resin composition as set forth in Example 2, Table 2-A, and testing for the char yield value in accordance with the method set forth herein. The results are reported in Table 3.

TABLE 3

Char Yield Value of Ethylene Diamine Phosphate Flame Retardant

| Type of Phase Transfer Catalyst | Amount of Phase Transfer Catalyst Present in Flame Retardant | | | | |
|---|---|---|---|---|---|
| | Control | 0.1 wt. % | 0.2 wt. % | 0.5 wt. % | 1.0 wt. % |
| TBAHS | 30 | 44 | 47 | 50 | 53 |

Table Note: Control is the epoxy resin composition with a flame retardant having 0 wt.% char catalyst.

Example 4

Preparation of Ethylene Diamine Phosphate/Melamine Phosphate

To 900 grams of water, while under agitation, was added 180 grams of ethylene diamine, 60 grams of melamine and char and/or phase transfer catalysts as set forth in Table 4 below. The mixture was warmed to 170° F. and, while maintaining temperature, phosphoric acid was slowly added until a pH of 7.0 was reached. The mixture was cooled, filtered, dried and ground to recover the flame retardant.

Char Yield Value Testing

The flame retardancy of the various ethylene diamine phosphate/melamine phosphate flame retardants was established by preparing epoxy resin coating samples by mixing the various flame retardants into the epoxy resin composition as set forth in Example 2, Table 2-A, or polyurethane coating samples by mixing the various flame retardants into Durbak 16, a polyurethane coating commercially available from Cote-L Industries, and testing for the char yield value in accordance with the method set forth herein. The results are reported in Table 4.

TABLE 4

Char Yield Value of Ethylene Diamine Phosphate/Melamine Phosphate Flame Retardant

| Type of Char and Phase Transfer Catalyst | Amount of Catalyst Present in Flame Retardant | | | | |
|---|---|---|---|---|---|
| | Control | 0.1 wt. % | 0.2 wt. % | 0.5 wt. % | 1.0 wt. % |
| TBABr (B-001 @ 0.5 wt.%) | 30 | 51 | 59 | 66 | 72 |
| B-001 (TBABr @ 0.5 wt. %) | 30 | 50 | 56 | 69 | 71 |
| BTEAC | 30 | 44 | 47 | 50 | 53 |

Table Note. Control is the epoxy resin composition with a flame retardant having 0 wt. % char catalyst.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. An activated nitrogenous phosphate flame retardant comprising the reaction product of:
   at least one nitrogen-containing reactant and at least one phosphorus-containing reactant capable of forming nitrogenous phosphate component, in the presence of
   at least one char forming tetraoxaspiro catalyst.

2. The flame retardant according to claim 1, wherein the char forming catalyst spiro-compound is represented by the following formula I:

$$R_2-R_1-(R_0)m\text{-}R_1-R_2 \quad (I)$$

wherein
   m represents a number between 1 and 8;
   $R_0$—independently represents a di-, tri-, or quad-valent radical comprising two independently substituted or unsubstituted, saturated or unsaturated heterocyclic ring structures joined by one common carbon atom, wherein the heterocyclic ring structures form a tetraoxaspiro group;
   $R_1$—independently represents a bond; or a substituted or unsubstituted, saturated or unsaturated hydrocarbyl or heterocarbyl linking group; and
   $R_2$—independently represent a terminal group.

3. The flame retardant according to claim 2, wherein $R_1$ independently represents a substituted or unsubstituted hydrocarbyl linking group.

4. The flame retardant according to claim 2, wherein $R_1$ independently represents a C1–C6 alkyl linking group.

5. The flame retardant according to claim 2, wherein $R_1$ independently represents a C3 alkyl divalent linking group.

6. The flame retardant according to claim 2, wherein $R_2$ indepentantly represents an amine.

7. The flame retardant according to claim 2, wherein $R_2$ independently represents a primary amine.

8. The flame retardant according to claim 2, wherein m represents a number less than 3.

9. The flame retardant according to claim 1, wherein the char forming tetraoxaspiro catalyst comprises at least one terminal amine.

10. The flame retardant according to claim 1, wherein the char forming tetraoxaspiro catalyst comprises at least one primary amine.

11. The flame retardant according to claim 1, wherein the char forming tetraoxaspiro catalyst has a molecular weight of at least 180.

12. The flame retardant according to claim 1, wherein the char forming tetraoxaspiro catalyst has a flash point of greater than 200° C.

13. The flame retardant according to claim 1, wherein the char forming tetraoxaspiro catalyst comprises two terminal amines.

14. The flame retardant according to claim 2, wherein at least two $R_1$ are the same and at least two $R_2$ are the same and m is 1.

15. The flame retardant according to claim 1, wherein the reaction product is formed in the presence of a phase transfer catalyst in addition to said char forming tetraoxaspiro catalyst.

16. The flame retardant according to claim 15, wherein the phase transfer catalyst comprises a tetramethyl, tetraethyl, tetrapropyl, tetralkyl, and/or aryltrialkyl ammonium salt.

17. The flame retardant according to claim 15, wherein the phase transfer catalyst comprises a bromide, chloride, hydroxide and/or hydrogen sulfate ammonium salt.

18. The flame retardant according to claim 15, wherein the phase transfer catalyst comprises tetraethylammonium bromide, tetraethylammonium hydroxide, tetrapropylammonium bromide, tetrabutyl ammonium bromide, tetrabutyl ammonium hydroxide, tetrabutyl ammonium hydrogen sulfate and/or benzyltriethyl ammonium chloride.

19. The flame retardant according to claim 15, wherein the flame retardant comprises less than 2.0 wt. % of a phase transfer catalyst.

20. The flame retardant according to claim 1, wherein the flame retardant is halogen-free.

21. The flame retardant according to claim 1, wherein the flame retardant is metal-free.

22. The flame retardant according to claim 1, wherein the flame retardant comprises less than 5.0 wt. % of char forming catalyst.

23. The flame retardant according to claim 1, wherein the flame retardant comprises less than 2.0 wt. % of char forming catalyst.

24. An article comprising the activated flame retardant according to claim 1.

25. The article of claim 24, wherein the article is a coating, binder, paint, fiber, emulsion, adhesive, casing, article of construction, rubberized component, cookware, medical device, composite, aeronautic component, putty, sealant, caulk, or fire barrier material.

26. The flame retardant according to claim 1, wherein the char forming tetraoxaspiro catalyst comprises a tetraoxaspiro undecane.

27. The flame retardant according to claim 1, wherein the char forming tetraoxaspiro catalyst comprises 2,4,8,10-tetraoxaspiro (5,5) undecane-3,9-dipropanamine.

28. The flame retardant according to claim 1, wherein the char forming tetraoxaspiro catalyst further comprises an amine adduct.

29. The flame retardant according to claim 1, wherein the char forming tetraoxaspiro catalyst further comprises a nitrile adduct.

30. The flame retardant according to claim 1, wherein the char forming tetraoxaspiro catalyst further comprises an oxirane adduct.

31. The flame retardant according to claim 1, wherein the char forming tetraoxaspiro catalyst comprises an amine adduct or nitrile adduct of 2,4,8,10-tetraoxaspiro (5,5) undecane-3,9-dipropanamine.

32. A method of forming a nitrogenous phosphate flame retardant comprising:

mixing nitrogen containing reactant for nitrogenous phosphate with at least one char forming tetraoxaspiro catalyst and, optionally, a phase transfer catalyst, and reacting the mixture with a phosphate reactant.

33. The method of claim 32, wherein the nitrogen containing reactant is ammonium, alkyleneamines, triazine, melamine, melam, melem, melon, ammeline, ammelide, 2-ureidomelamine, acetoguaniamine, benzoguanamine, quanidine, dicyanodiamide, diamine phenytriazine or mixtures thereof.

34. The method of claim 32, wherein the phosphate containing compound is phosphoric acid.

35. An article formed from the method according to claim 32.

36. The method according to claim 32, wherein the char forming tetraoxaspiro catalyst comprises a tetraoxaspiro undecane.

37. The method according to claim 32, wherein the char forming tetraoxaspiro catalyst comprises 2,4,8,10-tetraoxaspiro (5,5) undecane-3,9-dipropanamine.

38. The method according to claim 32, wherein the char forming tetraoxaspiro catalyst further comprises an amine, nitrile or oxirane adduct.

39. The method according to claim 32, wherein the char forming tetraoxaspiro catalyst comprises an amine adduct or nitrile adduct of 2,4,8,10-tetraoxaspiro (5,5) undecane-3,9-dipropanamine.

* * * * *